United States Patent [19]

Schumacher, II et al.

[11] 4,254,606
[45] Mar. 10, 1981

[54] MECHANISM FOR SWIVELING A MACHINE SUB-ASSEMBLY

[76] Inventors: Gustav Schumacher, II; Günter Schumacher, both of 5231 Eichelhardt, Westerwald, Fed. Rep. of Germany

[21] Appl. No.: 915,753

[22] Filed: Jun. 15, 1978

[30] Foreign Application Priority Data

Jun. 23, 1977 [DE] Fed. Rep. of Germany ....... 2728199

[51] Int. Cl.³ .............................................. A01D 67/00
[52] U.S. Cl. ....................................... 56/208; 267/122
[58] Field of Search ................................ 56/15.8, 208; 267/DIG. 1, 122, 65 D

[56] References Cited

U.S. PATENT DOCUMENTS

| 2,846,983 | 8/1958 | Otto | 267/122 |
|---|---|---|---|
| 2,983,506 | 5/1961 | Bertsch et al. | 267/65 D |
| 3,037,803 | 6/1962 | Phillips | 267/122 |
| 3,238,709 | 3/1966 | Williams | 56/208 |
| 3,266,230 | 8/1966 | Rowbotham | 56/208 |
| 3,509,701 | 5/1970 | Clarke | 56/208 |
| 3,548,573 | 12/1970 | Krehbiel | 56/208 |
| 3,598,353 | 8/1971 | De Grey | 267/122 |
| 3,736,737 | 6/1973 | Schumacher et al. | 56/208 |
| 3,783,594 | 1/1974 | Watt | 56/208 |
| 4,130,981 | 12/1978 | Schumacher et al. | 56/208 |

FOREIGN PATENT DOCUMENTS

987127  3/1965  United Kingdom ...................... 56/208

*Primary Examiner*—Gene Mancene
*Assistant Examiner*—Paul J. Hirsch
*Attorney, Agent, or Firm*—Steinberg & Raskin

[57] ABSTRACT

The invention relates to a mechanism for swivelling and spring-mounting a machine sub-assembly, mounted to swivel about an axis of rotation, for example the cutting bench of a harvester thresher, which bench is supported on the movable frame of the machine by way of a lifting unit, consisting of a lifting cylinder and piston, and a spring element, a spring element of limited stroke being provided between the lifting unit and its support, and means, such as a hydraulic force transducer or the like, also being provided for the purpose of varying the spring force of the spring element.

3 Claims, 5 Drawing Figures

MECHANISM FOR SWIVELING A MACHINE SUB-ASSEMBLY

The invention relates to a mechanism for swivelling a machine sub-assembly, and it concerns in particular the spring-suspension of a machine sub-assembly mounted to swivel about a shaft preferably on vehicles such as self-propelled harvesting machines such as harvester threshers, potato and beet lifters, swath layers and similar machines, as well as on certain machines used in the building industry. For the sake of simplicity, the following description will deal with the use of the invention in a harvester thresher.

When a harvester thresher is in use, the cutting bench of this machine must be moved over the ground in such a way that it does not dig into the ground, while at the same time it bears on the ground under such part of its weight that it does not lift when passing over uneven areas, but follows these areas and cuts down the cereal at the same height throughout.

Unfortunately, in practice difficulties continue to be encountered in moving the cutting bench, usually mounted on the harvester thresher to swivel about a horizontal axis, over the ground in the above-described manner. The major part of its weight is borne by one or more hydaulic cylinders which are linked at one end to the cutting bench and at the other to the end of the vehicle frame, and which enable the level of the cutting bench to be adjusted. To enable the cutting bench, while applying part of its weight, to move over the ground in such a way that it follows unevenness in the ground without digging into it, use is made of spring elements of very widely varying types. The most usual method is to provide a spring means directly in the pressurized medium that actuates the hydraulic cylinder. This spring means consists of a volume of gas of a certain size which is introduced into the hydraulic system and is compressed by the pressurized hydraulic fluid. When the pressure in the hydraulic system relaxes, for example when the cutting bench is travelling over an undulation in the ground, the volume of pressurized gas causes the major part of the weight of the cutting bench to be supported on the vehicle frame by way of the hydraulic cylinder or cylinders and only the remaining part of its weight to rest on the ground, the lift-type valve not being actuated for this purpose.

The disadvantage of such a hydro-pneumatic pressure storage means, contained in the hydraulic system, resides in the fact that this spring-suspension unit has a very steep spring characteristic curve, i.e. the hydraulic pressure diminishes appreciably even when the cutting bench is swung up to only a slight extent, so that the residual weight supported on the ground increases greatly and the cutting bench can easily dig into the ground.

To keep the spring characteristic curve flatter, it would be necessary to incorporate a pressure storage unit having a very large volume. This however, suffers from the disadvantage that the cutting bench is spring-urged not only upwardly, but also in the opposite direction, i.e., downwardly, when an additional load, for example incoming straw, acts on the cutting bench. This is very undesirable. What is therefore required is to cause the cutting bench to yield resiliently in the upward direction using the flattest possible spring characteristic curve, but to arrest its downward movement, if possible at a non-resilient point which is nevertheless adjustable.

In practice, it is desirable to set the cutting bench at a level of, for example, approximately 20 cm above the ground, and not permit it to yield downwardly, but at the same time to enable it to lift in a resilient manner without the expenditure of a great amount of force.

This cannot be achieved with the pressure-storage units of the known construction which take the form of diaphragms or bubble-type units, and furthermore there is the additional difficulty with this known arrangement that the gas pressure of the pressure-storage unit has to be adjusted as precisely as possible to suit the weight of the cutting bench. However, adjustment of the gas pressure can be carried out only with the help of the appropriate tools in a suitably equipped workshop, since the gas used, generally nitrogen, is under a very high pressure. Adjustment of the gas pressure is not possible during practical operations in the field. Since, furthermore, the gas pressure is subject to considerable variations, when the temperature fluctuates, optimum adjustment can hardly be achieved even if it were possible, in the field, to adapt the gas pressure to cater for the variations that occur and the conditions that exist.

The earlier German Patent Application P 25 02 666.8, in the name of the present Applicants, describes a hydraulic suspension system which avoids the above-mentioned disadvantages by the inclusion of a control cylinder between lifting cylinders and the pressure-storage unit. In this way it becomes possible to adjust the spring-suspension pressure and to limit the downward resilient movement of the cutting bench while fully maintaining the upwardly directed resilient support.

Although the arrangement in accordance with this Application in the name of the present Applicants has proved very reliable in practice, it suffers from some disadvantages which cannot be avoided in the hydraulic spring-suspension of the cutting bench.

These disadvantages consist mainly in the fact that, for each springing movement, first the breakaway resistance and the frictional forces of the sealing elements in the lift cylinders and in the control cylinder have to be overcome, secondly, in the case of rapid extension and compression of the spring means, enormous flow velocities occur in the hydraulic pipes, accompanied by corresponding pressure-losses and heating-up of the pressurized medium, and thirdly, losses of oil due to leakage at the rapidly reciprocating piston rods of the cylinders, and wear on the sealing elements are great.

The only possible way that remains for overcoming the above-stated disadvantages is to provide spring-suspension for the cutting bench with the aid of mechanical or phenumatic spring means, which operate without the use of the cushioning effect of the pressurized medium, so that no breakaway forces in the cylinders have to be overcome, and no high flow velocities of the pressurized medium and the accompanying inevitable pressure losses occur.

Although various constructions of this kind have been published, a solution that is satisfactory in all respects has not yet been found. The simplest form of mechanical suspension consists in fitting a helical spring between the cutting bench and the lifting cylinder. However, this helical spring must be precisely rated to suit the weight of the cutting bench. As soon as the cutting bench has been raised above the ground, the spring must become blocked, that is to say it must become compressed to such an extent that each of its turns bears against an adjacent turn so that the cutting bench cannot execute any downward spring-supported movement. However, the spring force must be fully available for upward movement of the cutting bench. Since the initially mentioned easy springing action is a prerequisite to efficient operations in the field, the spring characteristic curve must be very flat. This leads to very large helical springs which also have to be individually rated for each harvester thresher to suit the different weights of the various cutting bench constructions, and this leads to a large number of designs of spring. Furthermore, this form of spring-suspension suffers from the disadvantage that, when the agricultural implement is being driven on the roads, the springing cannot be eliminated or limited or reduced, and this leads to large oscillations of the cutting bench during travel over rough roads through fields.

Since the spring can be compressed only by the weight of the cutting bench, it is furthermore not possible to use this type of spring-suspension in the case of harvester threshers having removable cutting benches, since if the weight of the cutting bench is not present, the springs extend so much that the cutting bench cannot be connected up again.

To avoid these disadvantages, springs are fitted in such a way that the weight of the cutting bench is supported on them only when the bench is lowered. One end of each of the springs is supported on a backing element on the tube of the lifting cylinder, and the other end on a backing element on the piston rod, at least one backing element being axially displaceable by means of a screw-thread or a clamping collar to enable the spring to be suitably set.

The disadvantage of this type of construction is that it is difficult to determine the optimum setting of the spring, since this can be carried out only when the cutting bench is raised. Furthermore, the pressure in the lifting cylinders ceases completely as soon as the cutting bench is lowered, i.e. when its weight rests upon the spring and, likewise, when the cutting bench is supported by the spring, the piston rod moves backwards and forwards very rapidly. Since the sealing elements are not under hydraulic pressure, either a vacuum is set up in the pressure chamber of the cylinder when the spring extends, or air overcomes the resistance of the sealing lips and is drawn into the pressure chamber.

In the first case, extension of the spring is retarded by the vacuum and this leads to an effect similar to that of the initially mentioned overcoming of the breakaway forces in hydraulic spring-suspension systems, and in the second case the sucked-in air becomes mixed with the pressurized medium which leads to all the disadvantages affecting sealing elements and hydraulic pipes that are known and feared in all hydraulic installations.

The spring itself cannot be set to meet requirements during the harvesting work. Also, the spring force varies according to the level at which the bench has been set. If the bench is to be removed for the purpose of driving the implement on the roads, the setting of the clamping elements has to be altered each time so that the spring is not prestressed during detachment and connection of the cutting bench.

To obtain the necessary stroke travel for this type of spring-suspension, the piston rod, when fully retracted, must still project from the lifting cylinder over a considerable distance. This calls for a much longer cylinder so as to permit suitable lifting distances to be obtained. However, this longer construction runs counter to the need for a short linkage of the cutting bench, so that constructional disadvantages have to be accepted.

In a further known form of spring-suspension for a cutting bench using mechanical springs, the bench is not spring-mounted on the lifting cylinder; instead the latter is included in the springing system in such a way that the bench and the cylinder are spring-mounted in relation to the vehicle frame. Although this offers the advantage that no breakaway forces have to be overcome during the operation of the springing system, it suffers from the disadvantage that the spring is continually compressed to an extent depending upon the weight of the cutting bench. If the bearing pressure of the cutting bench is to be varied, the bias of the spring is altered by means of a nut on the cylinder tube. Since, with heavy cutting benches, the bias is very great, the nuts can be turned only by using a heavy tool and at the cost of considerable effort and time, and this cannot be done during work in the field.

In a form of construction in accordance with earlier Application P 24 18 232.9, in the name of the present Applicants, a pneumatic spring-suspension arrangement is described wherein the hydraulic lifting cylinder is spring-mounted on the vehicle frame by means of a pneumatic diaphragm cylinder. The diameter of the diaphragm cylinder is considerably greater than that of the lifting cylinder, so that, in contrast to the conditions obtaining when a direct cushioning effect is provided by the hydraulic medium with the aid of pneumatic pressure-storage means, this system can be operated using lower pressure. This lower pressure offers the advantage that atmospheric air can be used as the pressurized medium, and the pressure in the pressure-storage means can be varied with the aid of conventional compressors as used in lorries, petrol stations and workshops.

However, since harvester threshers and other agricultural, etc., machines are usually not provided with a compressor unit, the spring suspension pressure, once fixed, cannot be altered during work. However, even if a compressor were present, the raising of the spring suspension pressure, required to be carried out rapidly, takes too long, since the pressure in the entire volume of the storage means has to be raised.

It is known, starting from a fixed point, to set the position of a cutting bench at will in relation to the frame of the harvester thresher, the setting being carried out from the driver's platform, and the effect is that if this setting, called the "position" is briefly passed in the upward or downward direction, the cutting bench automatically returns to the "position" when the appropriate control signal is sent. Such a signalling means is described in Patent Application Ser. No. P 25 29 160.5, in the name of the present Applicants. To limit the differences in the positioning of the cutting bench as far as possible and depending upon whether the cutting bench has to be moved into the set "position" from above or below, the shift points in the control system must not be too far from each other. However, it has been found that because of the inertia of the cutting bench, the latter is sprung upwards as soon as it returns upwardly into its set "position". With optimum choice of the switching points, it overruns the set value and switches in the counter-signal again. The cutting bench then continues, from time to time, to be shifted upwards and downwards. Although this can be prevented by suitable time-delay switches, it should be possible to dispense with the use of such aids which are usually expensive.

The main object of the present invention is to provide a mechanically or pneumatically spring-mounted lifting cylinder for swinging a machine sub-assembly, which lifting cylinder is of small vertical dimensions, has large spring force and a very flat spring characteristic curve, while its travel stroke is limited so as to avoid oscillations, while its stroke is blocked as soon as the machine sub-assembly, e.g. the cutting bench, ceases to be in contact with the ground. Furthermore, the spring force of this lifting cylinder is intended to be adjustable during work in the field so that the cutting bench can be moved to suit the varying conditions of the ground and/or the varying harvesting conditions involving different weights bearing on the ground.

A further object of the invention is to use the travel stroke of the lifting cylinder to perform switching and control functions corresponding to its spring rating so as to enable the cutting bench to be automatically guided in a manner suited to the surface of the ground, with the effect that only one selected part of the weight of the bench comes to rest on the ground, it being intended that this weight should, as far as possible, remain substantially constant over the entire working range of the lifting cylinder.

Furthermore, the lifting cylinder is intended to enable the cutting bench to be set at a selected working level in relation to the vehicle frame without the work of the load-relieving spring falsifying this value, or the resilient movement of the cutting bench leading to periodic reversal of the system.

According to the invention, these objects are achieved by means of a mechanism for swivelling a machine sub-assembly mounted to turn about an axis of rotation, which sub-assembly is mounted on another machine sub-assembly, and/or on the movable frame of the machine by way of a lifting unit, consisting of a lifting cylinder and piston, and a spring element, characterized in that a spring element of limited travel stroke is provided between the lifting unit and one of its supports, and means are provided for varying the spring force of the spring element.

In a particularly advantageous embodiment of the present invention, a mechanical spring of limited travel stroke is provided between the lifting unit and one of its supports, and the spring can be biased by a hydraulic force transducer.

During operation of the springing system, the entire cylinder is moved in the longitudinal direction over the longitudinal distance between two stops in the backing element formed as a bearing block, without the hydraulically operating components of the lifting unit (cylinder and piston) moving towards each other. Thus neither breakaway nor frictional forces require to be overcome, and neither wear on the sealing elements nor losses of oil due to leakage occur.

In another particularly advantageous form of the mechanism in accordance with the invention, one end of the mechanical spring is supported by a backing element on the vehicle frame, and its other on a backing element on the lifting cylinder (or on the piston rod), at least one of the backing elements being hydraulicaly displaceable in the axial direction in relation to the other backing element for the purpose of setting the required bias of the spring. Expediently, the backing element on the vehicle frame is so designed that it also axially guides the lifting cylinder in such a way that the latter can move axially between two stops when the spring is performing its work.

The actual cylinder for biasing the spring can be constructed in any one of a large number of ways. In the following detailed description some typical forms of the lifting cylinder and the cylinder for biasing the spring will be dealt with without, however, the invention being limited to these specifically described constructions.

In a construction that has proved particularly advantageous, the actual lifting cylinder for the cutting mechanism serves as a component of the hydraulic cylinder for biasing the spring and forms the piston rod of this cylinder. The hydraulic cylinder is thus disposed concentrically with the lifting cylinder and surrounds it, and at the same time it forms the backing element for the spring.

This arrangement offers the advantage that the entire unit can be kept extremely compact, this being very desirable in limiting the dimensions of the assembly.

According to the present invention, the hydraulic cylinder for stressing the spring is displaced axially in relation to the lifting cylinder in dependence upon whether pressurized medium is supplied to or discharged from a pressure chamber between the lifting cylinder and the hydraulic cylinder. The backing element for the spring on the hydraulic cylinder for stressing the spring is likewise displaced relatively to the second backing element for the spring, and thus stresses or relaxes the spring.

The pressurized medium for the hydraulic cylinder for stressing the spring is controlled by means of a three-way valve of known kind which is closed in the median zero position, and in the two other positions either admits pressurized medium to the hydraulic cylinder or allows it to flow therefrom.

Although the three-way valve is able to take the necessary pressurized medium from the usual hydraulic circuit of the machine, it has been found particularly advantageous if the pressure medium in the lifting cylinder is used for this purpose. Although this means that the cutting bench must first be raised in order to make available pressurized medium for the hydraulic cylinder for stressing the spring, it offers the advantage, on the other hand, that the three-way valve, apart from being connected to the lifting cylinder, has only to be connected to the return line of the hydraulic system.

The required bias can be set by means of a manometer of known kind since the pressure in the hydraulic cylinder for stressing the spring is independent of the spring stress. On the other hand, however, this setting can also be achieved by measuring the distance that is travelled by the backing element, moved by the hydraulic cylinder, in relation to the end of the lifting cylinder, which element moves in the axial direction between the two above-mentioned stops in dependence upon the spring work.

In the latter case an automatically self-adjusting biasing force of the spring can be achieved. This means that when the biasing stroke alters because of leakage points at the three-way valve or any other hydraulic component, switching operations which readjust the biasing stroke are triggered off by means of suitably fitted rods, ties, potentiometers or other appropriate measuring and control elements.

The unit consisting of the lifting cylinder and the hydraulic cylinder for stressing the spring can be arranged as described in the following embodiments, but the arrangement may be reversed. It is immaterial as regards the functioning of the system whether the lifting cylinder is carried in a bearing block and linked to the vehicle frame and its piston rod linked to the cutting bench, or vice versa.

The spring is preferably so set that the lifting cylinder just bears against the stop that blocks the downward resilient movement of the cutting bench as soon as the latter is lifted to such an extent that it no longer touches the ground. Additional loads on the cutting bench (incoming straw) cannot therefore press the cutting bench downwards. However, when uneven ground or other obstacles bear against the underside of the cutting bench, the bench is able to spring upwardly to an extent that is determined and limited by the second stop.

Since the length of the lifting cylinder plus its piston rod does not change during operation of the spring system, this works out very well for determining and automatically maintaining a particular required setting of the level of the cutting bench. For this purpose, suitable rods, ties, potentiometers or other suitable measuring and control means can be fitted between the cylinder and the piston rod, i.e. along a path over which the piston rod executes its stroke. When a certain control position is achieved in a suitable manner, the lifting cylinder moves back to its original setting after each control over-travel, due to other control signals.

The oscillations of the cutting bench likewise do not cause variations in the extent to which the piston rod protrudes from its cylinder and thus in the total length of the lifting unit, so that these oscillations cannot trigger off any switching operations that lead to the cutting bench being periodically moved up and down.

A further possibility of fixing the "position" of the cutting bench in relation to the vehicle frame, without the oscillations falsifying the setting value through the spring elements, is to fit the measuring and control elements between the lifting cylinder and, say, the middle of the inclined conveyor. In this way, the control strokes are halved and this leads to a reduction in the size of the measuring and control elements.

On the other hand, the variability in length of the spring, when this is subjected to fluctuating loads, can be used for measuring and control purposes if a certain weight whereby the cutting bench bears on the ground is to be kept constant over a wide range of swing. Springs having a sufficiently flat characteristic curve, which have a sufficiently great axial stroke without loss of power, are very bulky and are therefore difficult to accommodate. In order, nevertheless, to keep the spring force approximately constant over a wide range of swing of the cutting bench, when the spring characteristic curve is fairly steep, the lifting cylinder must be moved out and in. The driver is overtaxed if he has to carry out this control operation by hand. According to the invention, this control can be carried out in a simple manner by means of regulating elements which are actuated in dependence upon the travel stroke of the spring.

It has been found particularly advantageous to use the axial stroke of the lifting cylinder of the invention, between the two stops which limits its travel stroke, for controlling the pressure medium in the lifting cylinder. If a control setting is suitably established, pressurized medium is admitted to the lifting cylinder when the latter bears against the stop which limits the outward spring action, and pressurized medium is discharged from the lifting cylinder when it bears against the other stop limiting the inward spring travel stroke.

In the pneumatic spring-suspension of the lifting cylinder in accordance with the earlier Application P24 18 232.9, the lifting cylinder is axially guided in a pneumatic cylinder and exercises its spring action in accordance with the length of the pneumatic cylinder, the foot of the hydraulic cylinder, which is of enlarged diameter, also forming the piston of the pneumatic cylinder. The system is sealed off by means of a rolling diaphragm, so that no breakaway or frictional forces have to be overcome during the operation of the spring system.

To achieve a flat spring characteristic curve during the spring work carried out by the pneumatic cylinder, the latter is connected to a compressed-air container forming a pressure-storage means. The air pressure in the container is so selected that, when the cutting bench is raised, the hydraulic cylinder is forced into the pneumatic cylinder until the bottom of the hydraulic cylinder, forming a piston, just bears against the bottom of the pneumatic cylinder. The cutting bench is able to deflect to an extent equal to the length of the pneumatic cylinder, i.e. the hydraulic cylinder is able to move out of the pneumatic cylinder until the base of the hydraulic cylinder encounters the head plate of the pneumatic cylinder at the other end.

As in the case of the above-mentioned lifting cylinder having mechanical spring-suspension means, the distance between the lifting cylinder and the cutting bench or the piston rod of the lifting cylinder is a very suitable quantity for use in measuring and controlling the "position" of the cutting bench, since here again, no change in length occurs during the spring work. However, this occurs between the pneumatic cylinder and the hydraulic cylinder, and this change in length is eminently suitable for measuring and controlling the cutting bench in dependence upon the weight applied by the bench to the ground.

Since the spring travel stroke is determined by the length of the pneumatic cylinder, this stroke can be so selected that the cutting bench cannot oscillate over a wide range when the implement is being driven along uneven paths through fields.

The only disadvantage of this spring-suspension system is that the spring force cannot be adjusted if the air pressure in the container is kept constant. If use is made of an air compressor, it takes too long for the counterpressure to be raised, for example. An object of the invention is, therefore, also to provide, for this type of spring-suspension system, a pressure-adjusting unit which enables the pressure to be varied in a matter of seconds during work in the field.

This object is achieved by means of a second compressed-air container having a considerably higher pressure than that of the pressure-storage means to which the pneumatic cylinder is connected. The two containers are connected by way of a pressure-adjusting valve which operates in the known manner and is preferably fitted within the reach of the driver. If the driver wishes to raise the bearing weight of the cutting bench, he releases pressure from the first container; if he wishes to reduce this weight, he allows pressure from the second container to pass into the first. Only a small volume of air is required for this adjustment, and this can be supplied by a correspondingly small air compressor at correspondingly low cost, which compressor is connected to the second container.

The invention will now be described in greater detail by reference to a number of forms of construction illustrated in the accompanying drawings.

In the drawings.

Figure 1:
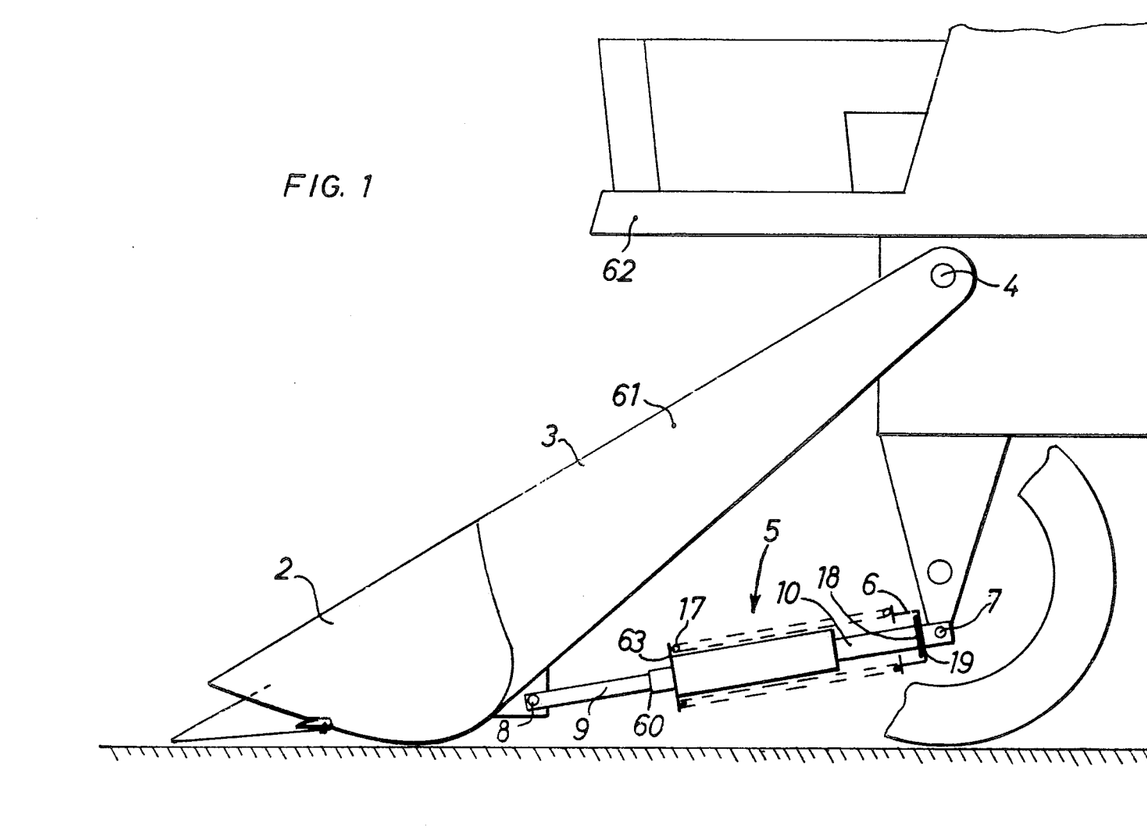
FIG. 1 is a diagrammatic side-view of a harvester thresher with the lifting cylinder of the invention and the various measuring and regulating points.
Figure 2:
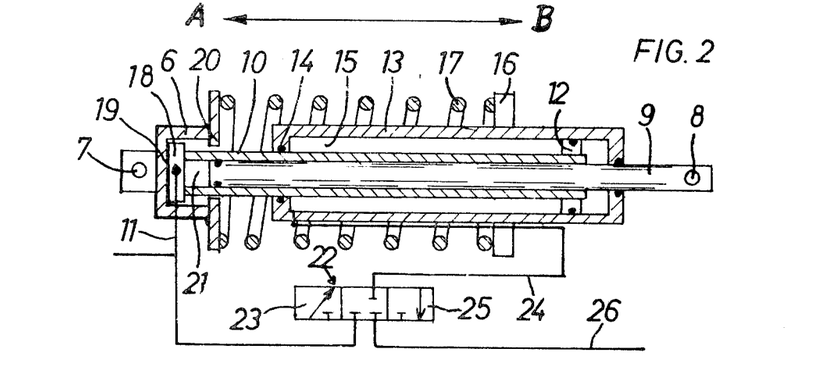
FIG. 2 illustrates an embodiment with a hydraulic biasing cylinder for setting the bias of the spring and arranged concentrically around the lifting cylinder, and with a three-way valve for controlling the biasing cylinder.

Referring to FIG. 1, the cutting bench 2 is swivellably mounted on the harvester thresher 1 at 4 by way of the inclined conveyor 3. The lifting cylinder unit 5 shown in FIG. 2 is linked, together with a bearing block 6, to the vehicle frame at 7, and to the cutting bench at 8.

The cylinder unit includes a piston rod 9 which is disposed in an inner cylinder 10 and in known manner is acted upon by pressurized medium delivered through a line 11. A collar 12 is secured in a water-tight manner to the cylinder 10, and an outer cylinder 13 is mounted in a water-tight manner to slide over the collar 12. The outer cylinder 13 is provided at one end with a collar 14 which is also mounted to slide on the inner cylinder 10 in a water-tight manner. Between the collar 12 on the inner cylinder and the collar 14 on the outer cylinder there is thus formed a pressure chamber 15. A further collar 16, acting as a backing element for a spring 17, is provided on the outer cylinder 13. As discussed below, the structure defining the pressure chamber 15 including the outer cylinder 13 comprises hydraulic force transducer means for varying the prestressing of the spring 17.

A collar 18 on the inner cylinder 10 is so mounted in a rear bearing block 6 that it is able to move in the axial direction between its rear bearing face 19 and a forward flange 20. The flange 20 also forms the rear backing element for the spring 17.

In the unpressurized condition, i.e. when pressurized medium is present neither in the pressure chamber 21 of the inner cylinder nor in the pressure chamber 15 of the outer cylinder 13, the piston rod 9 is pressed into the cylinder 10 by the weight of the cutting bench 2, and the bench rests on the ground with its entire weight. Because of the absence of counter-pressure, the spring 17 has likewise extended and has moved the outer cylinder over the inner cylinder in the direction in which the spring extends.

If pressure medium is now admitted into the pressure chamber 21 of the inner cylinder 10 through the line 11, the piston 9 is forced out of the cylinder and the cutting bench 2 lifts. Since there is no pressurized medium in the pressure chamber 15 of the outer cylinder and the spring 17 is therefore not stressed, the entire weight of the cutting bench is transmitted to the bearing block 6 by way of the collar 18 of the inner cylinder 10. The collar 18 bears in the direction A on the bearing block 6 at 19. In this position the cutting bench cannot transmit its weight to the bearing block 6 by way of the spring 17, and it therefore has no spring-support.

If a valve 22 is now moved into the switching position 23, pressure medium is delivered through the line 24 into the pressure chamber 15 of the outer cylinder 13. This moves in the direction A and transmits the weight of the cutting bench 2 to the flange 20 and therefore to the bearing block 6, by way of the collar 16 and the spring 17. The pressure of the collar 18 on the bearing block 6 relaxes in dependence upon the increasing bias of the spring 17 and cannot quite completely cease; rather, with increasing bias of the spring 17 the collar 18 becomes separated from its rear bearing face 19, and the entire cylinder unit is moved in the direction B by this collar. Movement in this direction is limited by the stop on the flange 20 against which the collar 18 comes to bear after a certain distance of travel. In this position further resilient extension of the cylinder unit is blocked.

If the valve 22 is then moved into the switching position 25, the line 24 is connected to the return line 26. The pressure in the pressure chamber 15 diminishes and the stressed spring 17 presses the biasing cylinder 13 in the direction B and relaxes in so doing. The weight of the cutting bench 2 is no longer transmitted by the spring 17 to the bearing block 6, and as relaxation of the spring 17 proceeds, the weight of the bench presses the collar 18 against its rear stop in the bearing block 6.

In practice, the bias of the spring 17 is so selected that when the cutting bench is raised from the ground, the collar 18 still just bears at the face 19 in the bearing block 6 in the direction A. Downward resilient movement of the cutting bench is thus blocked. If, for some reason (undulations in the ground or the like), the cutting bench is lifted, it is resiliently lifted in dependence upon the possible axial travel of the collar 18 in the bearing block 6. After the undulations have been passed, the cutting bench drops again, and the collar 18 again bears against the bearing block 6 in the direction A.

Figure 3:
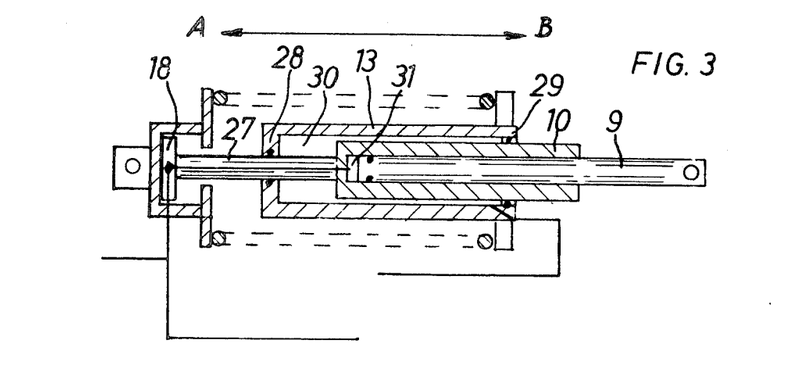
FIG. 3 illustrates a further embodiment with a biasing cylinder arranged concentrically around the lifting cylinder.

FIG. 3 illustrates a form of the double cylinder in accordance with the invention, wherein a piston rod 27 is rigidly attached to the bottom of the inner cylinder 10. Guided to slide in a water-tight manner around this piston rod is a flange 28 of an outer cylinder 13, whereas the other end 29 of the outer cylinder is guided to slide in a water-tight manner on an inner cylinder 10. The difference between the cross-sections of the piston rod 27 and the inner cylinder 10 causes displacement of the outer cylinder 13 in the direction A as soon as pressurized medium is admitted to the pressure chamber 13. The piston rod 27 terminates in a collar 18 which, as in the previous example, is able to move in the axial direction in a bearing block 6 over a certain distance. The line for supplying hydraulic medium is advantageously likewise connected to the collar 18, and medium passes through a bore formed in the piston 27 into the pressure chamber 31 of the inner cylinder.

The FIG. 3 construction is advantageous in those cases where a longer double cylinder is required and a short stroke of the inner cylinder suffices.

Figure 4:
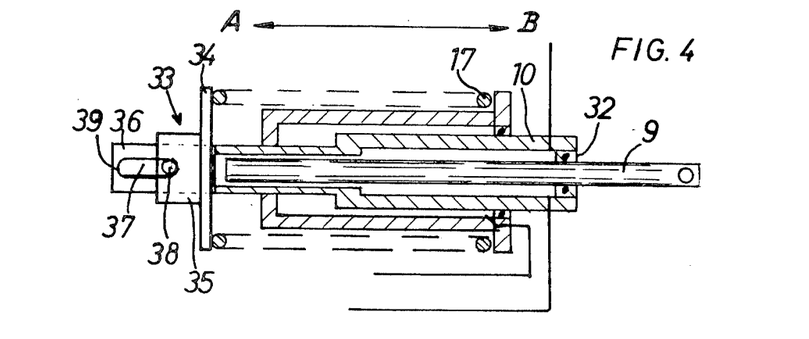
FIG. 4 shows a further embodiment with a biasing cylinder arranged around the lifting cylinder, and with a slot for limiting the spring travel stroke.

FIG. 4 illustrates an arrangement which combines constructional advantages with short dimensions and long strokes.

The inner lifting cylinder 10 is of stepped construction so that the mode of operation of the outer cylinder is similar to that described in connection with FIG. 3. In this case, the piston rod 9 slides in a water-tight manner in a collar 32. Otherwise, the reference numerals and the mode of operation are the same as for FIG. 3.

The rear bearing block 33 in FIG. 4 is of different construction and can be used in this form in all the other versions of the cylinder unit. This bearing block consists mainly of a flange 34, forming a backing element for the spring 17, and of end shanks 35 solidly connected to the flange. Between the shanks is an extension 36 which is firmly connected to the rear end of the inner cylinder 10 and is so mounted that a slot 37 formed in said extension permits axial displacement of the cylinder unit relatively to the bearing block 33. The two shanks 35 (the one on the opposite side cannot be seen in the drawing) are hinged, by means of a pin 38, on the frame of the harvester thresher. This pin also limits the axial movement of the cylinder unit in that the rear end 39 of the slot 37 encounters the pin 38 when the cylinder moves, under the action of the spring, in the direction B and over a distance equivalent to the length of the slot.

A large number of further modified forms, not illustrated, are possible. For example, use could be made of cylinders of annular construction with ring pistons which could act directly on the spring 17 through a backing element, or which, through tie-rods, could vary the distance between the two backing elements for the spring 17, and could thus also increase or reduce the bias of the spring 17.

It is also possible to displace the rear backing element relative to the front element instead of the front backing element relative to the rear element.

Figure 5:
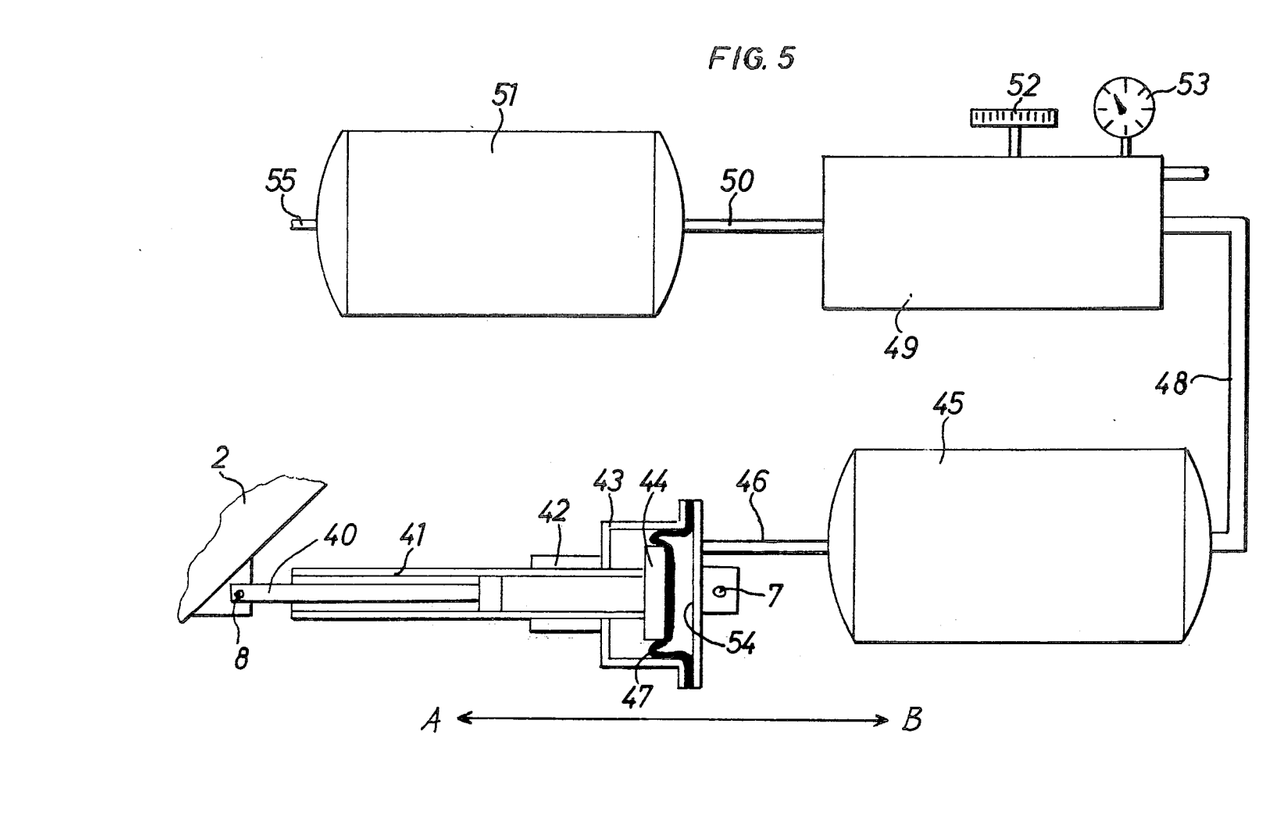
FIG. 5 illustrates a pneumatic spring suspension of the lifting cylinder using the bearing pressure adjustable in accordance with the invention.

FIG. 5 illustrates an arrangement whereby the lifting cylinder can be pneumatically spring-mounted using a variable springing pressure. The cutting bench 2 is lifted and lowered in the known manner by means of the piston 40 of the lifting cylinder 41. The cylinder is guided in the guide bush 42 of the pneumatic cylinder 43, and the base 44 of the lifting cylinder 41 also forms the piston of the pneumatic cylinder. In this cylinder compressed air from the pressure-storage unit 45, which is connected through the line 46 to the pneumatic cylinder, is sealed off by a rolling diaphragm 47. The pressure-storage unit 45 is connected through a line 48 to a pressure-adjusting valve 49 which is in turn connected to a second pressure container 51 through a line 50.

The pressure-adjusting valve 49 has a setting wheel 52, and a manometer 53 indicates the pressure in the line 48 and the pressure-storage unit 45.

The lower the pressure in the container 45, the greater is the weight of the cutting bench 2 that is supported, by way of the lifting cylinder 41, on the rear closure plate 54 of the pneumatic cylinder 43. The end 44 of the lifting cylinder bears at 54 entirely in the direction B. If the cutting bench 2 is lifted by an undulation in the ground or the like, the bearing force is reduced, and the pressure of the storage unit 45 presses the cylinder 41 in the direction A by way of the diaphragm 47.

If operations are to be carried out under conditions in which the cutting bench applies very little weight to the ground, pressure is supplied from the second pressure container 51 to the storage unit 45 with the aid of the setting wheel 52. If work is to be carried out with the cutting bench applying a greater weight to the ground, pressure is released from the storage unit 45 by means of the setting wheel 52.

A considerably higher pressure than is necessary for relieving the cutting bench of load always obtains in the pressure container 51. Thus the pressure in the storage unit 45 can be raised in a matter of seconds. All that is required is a small compressor unit (not illustrated) which always supplies the container 51 with an adequate pressure reserve by way of the line 55.

Both the mechanical spring-suspension arrangement for the lifting cylinder involving the use of a spring force adjustable by means of a biasing cylinder, and the pneumatic spring-suspension arrangement for the lifting cylinder are, as mentioned above, suitable for measuring and controlling both the "position" of the cutting bench in relation to the vehicle frame and for measuring the spring work necessary for controlling the cutting bench in dependence upon the weight that it applies to the ground.

FIG. 1 illustrates the measuring points and their functional relationship.

For fixing the "position" it is first possible to make use of the length of piston rod extending from the lifting cylinder 10, since their length ratio does not vary during the spring work. The points 8 to 60 as well as the points 8 to 18 can be used as linkage points for the measuring elements.

Since, however, when selecting these linkage points the entire extended length of the lifting piston 9 must be included if the control range of the "position" is to extend over the entire range of swing of the cutting bench, it has been found advantageous for the linkage points of the lifting cylinders 10 to be located towards the middle of the inclined conveyor at 61. In this way, the measuring and adjusting stroke is roughly halved and this leads to measuring and adjusting instruments of smaller size.

In contrast to the known adjustment by way of a fixed point 62 on the driver's platform to the inclined conveyor 3, in this solution the spring work is largely eliminated since the lifting cylinder moves similarly to the inclined conveyor.

If, however, the lifting piston 9 is extended, only the inclined conveyor moves in its axial direction, and not the lifting cylinder. As this happens, the distance from 60 to 61 and from 18 to 61 changes and actuates the measuring and adjusting elements so that these perform switching functions.

To control the cutting bench automatically in dependence upon the weight that it applies to the ground, use is made of the work carried out by the spring 17. During this work the collar 18 moves in the bearing block 6 within axial limits as described above. The measuring and adjusting elements for effecting control in dependence upon the weight applied by the cutting bench to the ground are therefore expediently so fitted that this axial travel stroke triggers control impulses.

In the case of the pneumatic spring-suspension of the lifting cylinder illustrated in FIG. 5, adjustment of the "position" can likewise be carried out in dependence upon the linkages at 8, on the hydraulic lifting cylinder 41, with the cutting bench, or with the inclined conveyor.

For automatic adjustment in dependence upon the weight applied by the cutting bench to the ground, use can be made of the axial travel of the hydraulic cylinder 41 in relation to the pneumatic cylinder 43, since their axial spacing varies when the pneumatic cylinder is performing spring work.

In the pneumatic type of spring-suspension, the bearing pressure is adjusted by the pressure-adjusting valve 49. In spring-suspension by means of mechanical springs, the pressure in the biasing cylinder can be created both by manual operation of the three-way valve 22 and by means of automatic measuring and adjusting elements. It has been found particularly advantageous if the distance 18-63 (FIG. 1) is used for this purpose. A set biasing stroke is automatically maintained by means of springs, rods, potentiometers or other suitable measuring and control elements by causing their impulses to act upon the three-way valve 22.

What we claim is:

1. In a combination including a first machine element pivotally mounted to a second machine element about an axis of rotation and further including means for pivotally lifting said first machine element relative to said second machine element comprising a lifting cylinder and a lifting piston slidably disposed therewithin, the improvement comprising:

a spring element having a stroke and mounted with an adjustable prestressing for applying a biasing force tending to support said first machine element;

hydraulic force transducer means for selectively varying the prestressing of said spring element so that a desired biasing force is applied thereby and in a manner such that said prestressing is so varied independently of the particular position of said lifting piston with respect to said lifting cylinder; and means for limiting the stroke of said spring element comprising a bearing member including a flange and a rear bearing face axially displaced from said flange to define a stroke limiting space therebetween and wherein said lifting cylinder has a portion disposed within said stroke limiting space adapted for movement therein.

2. In a combination including a first machine element pivotally mounted to a second machine element about an axis of rotation and further including means for pivotally lifting said first machine element relative to said second machine element comprising a lifting cylinder and a lifting piston slidably disposed therewithin, the improvement comprising:

a spring element mounted with adjustable prestressing for applying a biasing force tending to support said first machine element, said spring element having a stroke which is limited by a pair of opposed stops;

hydraulic force transducer means for selectively varying the prestressing of said spring element so that a desired biasing force is applied thereby and in a manner such that said prestressing is so varied independently of the particular position of said lifting piston with respect to said lifting cylinder; and means for controlling the introduction of a pressurized medium into said lifting cylinder as a function of said spring element stroke.

3. In a combination including a first machine element pivotally mounted to a second machine element about an axis of rotation, apparatus for pivotally lifting said first machine element relative to said second machine element comprising:

a bearing block linked to one of said first and second machine elements, said bearing block having a rear bearing face and a forward flange having an opening formed therein, said flange being located in spaced opposed relationship to said rear bearing face to define an axially extending interior space therewithin;

an inner lifting cylinder having a closed end extending through said forward flange opening and movably located within said interior space of said bearing block, said closed end having a first collar provided thereon having front and rear bearing faces adapted to abut against the inner surface of said forward flange and bearing block rear bearing face respectively upon the lifting cylinder axially moving with respect thereto;

a piston rod slidably disposed within said inner lifting cylinder having an inner end portion in fluid sealing relation with the interior of said lifting cylinder defining a first pressure chamber therewithin and an outer end portion extending exteriorly from said lifting cylinder adpated to be linked to the other of said first and second machine elements;

a second collar secured to the outer surface of said lifting cylinder;

an outer biasing cylinder disposed concentrically over said inner lifting cylinder in slidable relation therewith, said outer cylinder having a first end in fluid sealing relation with said inner cylinder and a second end in fluid sealing relation with the outer end portion of said piston rod, said second collar also being in fluid sealing relation with the interior surface of said outer biasing cylinder, the space between said first end of said outer cylinder and said second collar defining a second pressure chamber within said outer cylinder;

a backing element secured to the outer surface of said outer biasing cylinder;

spring means extending between said backing element and said bearing block forward flange; and means for controlling the introduction of pressurized medium into said first and second pressure chambers whereby said spring means can be prestressed to a desired extent independently of the position of said piston rod within said inner lifting cylinder by suitably supplying pressurized medium into said second chamber.

* * * * *